United States Patent [19]

Lesk

[11] 4,062,352

[45] Dec. 13, 1977

[54] SOLAR FLUID HEATER

[75] Inventor: Israel Arnold Lesk, Scottsdale, Ariz.

[73] Assignee: Motorola, Inc., Schaumburg, Ill.

[21] Appl. No.: 768,309

[22] Filed: Feb. 14, 1977

Related U.S. Application Data

[62] Division of Ser. No. 588,977, June 20, 1975, abandoned.

[51] Int. Cl.² ................................................. F24J 3/02
[52] U.S. Cl. ................................................... 126/271
[58] Field of Search ............... 126/270, 271; 237/1 A; 60/641; 52/616, 171, 209

[56] References Cited

U.S. PATENT DOCUMENTS

| | | | |
|---|---|---|---|
| 1,056,861 | 3/1913 | Walker | 126/271 |
| 2,917,817 | 12/1959 | Tabor | 126/270 |
| 3,399,664 | 9/1968 | Suhay | 126/271 |
| 3,680,307 | 8/1972 | Michalec | 126/271 |
| 3,981,294 | 9/1976 | Deminet et al. | 126/271 |

FOREIGN PATENT DOCUMENTS

| | | | |
|---|---|---|---|
| 1,138,992 | 1/1969 | United Kingdom | 126/270 |

*Primary Examiner*—Kenneth W. Sprague
*Assistant Examiner*—James C. Yeung
*Attorney, Agent, or Firm*—Kenneth R. Stevens

[57] ABSTRACT

A solar fluid heater includes a first planar surfaced collector for transmitting solar energy to heat a fluid located in a plurality of passages adjacently disposed to the collector. A honeycomb convection suppressor includes sidewalls orthogonally disposed to the planar surface of the collector for reducing convection heat losses. A selective coating disposed over the planar surface reduces radiation losses. Insulator material is disposed on the bottom side of the fluid carrying passages further minimizing losses from the heated fluid or water. In a dual sided fluid heater embodiment, another honeycomb conduction suppressor is disposed on the other side of the planar surfaced collector and direct and reflected solar energy is transmitted through both a top and bottom outer cover.

2 Claims, 4 Drawing Figures

SOLAR FLUID HEATER

This is a division of application Ser. No. 588,977, filed June 20, 1975, abandoned.

BACKGROUND OF THE INVENTION

It has been long realized in a general sense that the efficiency of a heat exchanger increases at higher temperatures. Counterbalancing this desirable mode of operation, however, is an attendant increase in heat losses at elevated temperatures. Prior art in the industrial area is replete with solutions to this problem, but factors, such as, cost, weight of materials, design geometries and types of materials generally are not significant limiting considerations. The heat loss problems related to contemporary solar fluid heaters for smaller scale users, on the other hand, do not enjoy the solution flexibility existing in heavier industrial applications. Cost, compactness, weight and ease of mounting are a few of the major factors to be considered when addressing the problems of heat loss in these latter mentioned applications.

SUMMARY OF THE INVENTION

A solar fluid heater, particularly adaptable for heating water, which employs an internal solar collector plate disposed adjacent to passages carrying water to be heated. Located on one or both sides, for transmitting direct or direct and indirect solar energy, respectively, is a convection heat loss suppressor. The conduction heat loss suppressor comprises a honeycomb structure which is interposed between the flat surface of the collector plate and an outer solar transmitting cover for enclosing the system and isolating it from ambient conditions. The flat surface of the solar collector plate is also covered with a selective coating for minimizing radiant heat losses. In a one sided convection suppressor version, insulating material is disposed on the other side and adjacent to the fluid carrying passages in order to further reduce losses.

DESCRIPTION OF THE PREFERRED EMBODIMENTS

Figure 1:
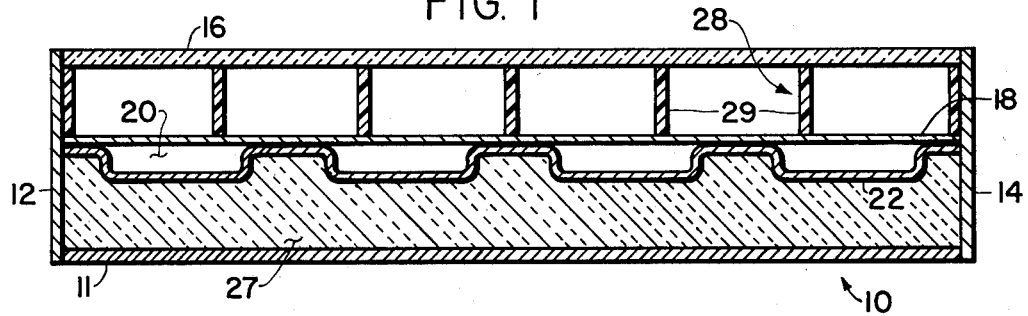
FIG. 1 is a cross-sectional view of the solar heater which employs a single convection heat suppressor.

Now referring to FIG. 1, it illustrates a single sided convection suppressor solar heater 10 comprising a bottom base member 11 and a pair of vertical sidewalls 12 and 14. A solar energy transparent top cover member 16 formed from a suitable material, such as glass or plastic, encloses the internal portions of the solar fluid heater from ambient conditions. Disposed internally in the unit 10 is a flat solar collection plate 18 adapted to receive solar energy transmitted through the outer solar transparent top cover 16. A plurality of fluid or water carrying passages designated generally at 20 are formed by fixedly attaching a continuous stamped thin shell member 22 to the under surface of the solar collector plate 18. Any suitable bonding technique, for example, welding can be employed to affix member 22 to the lower surface of collector plate 18 in order to ensure that the joints defining the plurality of passages are fluid tight and capable of withstanding the pressures and weight of the fluid being heated. Located between the bottom base plate 11 and the under surface of the member 22 is insulating material 27 for further preventing losses from the heated fluid.

Figure 3:
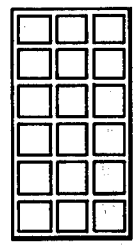
FIG. 3 is a plan view illustrating a conduction heat suppressor unit having a honeycomb configuration for use in the solar heaters of FIGS. 1 and 2.

A convection suppressor member 28 formed from a thin plastic material is positioned between the outer cover 16 and the collector plate 18. The convection suppressor 28 is most effective to reduce convection heat losses when arranged in a honeycomb configuration as best shown in FIG. 3. The vertical walls 29 of the convection suppressor minimize heat losses due to circulatory air currents created by the temperature differential existing between the cover 16 and the upper surface of collector plate 18.

FIG. 1 is only illustrative of the solar heater structure and does not show the fluid distributing apparatus. However, conventional pumps, and valve control units can be employed to circulate the fluid, water in the preferred embodiment, through the plurality of interconnected passages. After the fluid or water has been heated to an appropriate temperature it may be stored in a central reservoir storage tank. Thereafter, monitoring and control equipment would be operative to supply the central reservoir with the amount of heated water necessary to maintain the central supply at the desired temperature and level.

Figure 2:
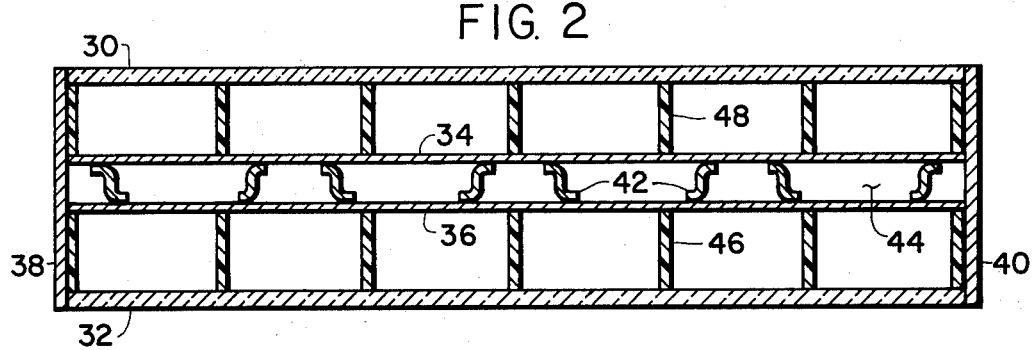
FIG. 2 illustrates in cross-section a solar heater which employs dual convection heat suppressors and dual solar collecting plates for heating fluid carried between the pair of collector plates.

FIG. 2 illustrates a dual sided solar fluid heater in which both the upper and lower outer covers 30 and 32 are formed of a solar transmitting material, such as, glass or plastic. In this version, a pair of solar collecting plates 34 and 36 formed with thin sheets of plastic are disposed within the housing formed by the upper and lower outer covers 30 and 32 in conjunction with the sidewalls 38 and 40. The collector plates 34 and 36 are separated by a plurality of vertically disposed plastic or metal spacers generally designated at 42. The plastic spacers are suitably joined to the collector plates 34 and 36, for example, by welding or epoxy bonding compatible with the type of material selected for the collector plates. In addition to providing mechanical rigidity between the collector plates 34 and 36, the supports 42 also define a plurality of fluid carrying passages generally shown at 44. Similar to the FIG. 1 version, the collector plates are separated from the solar transmitting outer covers 30 and 32 by a pair of convection suppressors 46 and 48. These convection suppressors are formed of a molded plastic material in a honeycomb type configuration as again best illustrated in FIG. 3.

Figure 4:
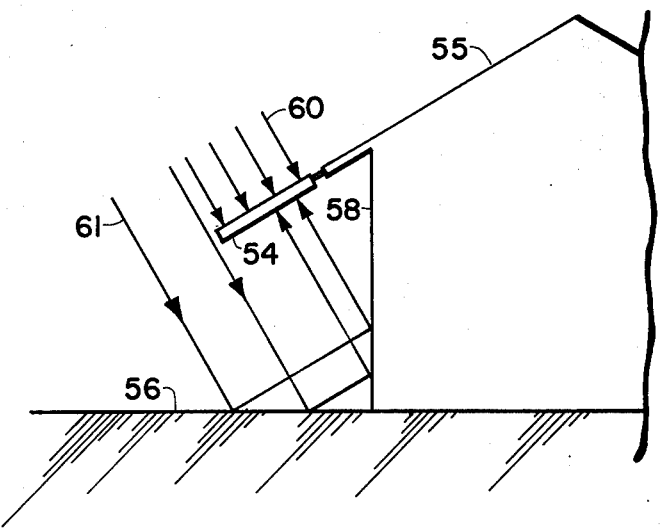
FIG. 4 is a schematic diagram illustrating one manner of mounting the dual sided convection suppressor solar heater of FIG. 2 as an add-on unit to an existing structure or dwelling

A dual sided solar fluid heater 54 can then be mounted on a dwelling or structure 55, as illustrated in FIG. 4, and positioned with respect to reflector walls 56 and 58 disposed, in a preferred embodiment, orthogonal to each other. In this manner, the upper collection plate is capable of receiving direct solar rays 60 while the lower collector plate receives direct solar rays 61 reflected from the surface 56 and 58.

The efficiency of the solar heater units of the FIG. 1 and 2 embodiments is further improved by depositing a selective coating on the outer surface of the collectors 18, 34 and 36. The selective coating possesses the characteristic of being highly absorbant to solar energy, but a poor emitter of energy in the infrared range. When the outer surface of the collector plate is implemented as a thin sheet of metal, a suitable selective coating can be obtained by electro-plating a thin black nickel or black chrome layer over the surface of the collector plate. It is also feasible to form the collector plate of a plastic material and in this implementation the selective coating could be deposited using a suitable paint-on material, such a NEXTEL, which is manufactured by and a trademark of the 3M Company. Typical material dimensions for a 3 by 6 foot solar fluid heater having a thickness in a range of 4 to 6 inches are as follows: an outer transparent glass or plastic cover plate = inch thick, a plastic honeycomb convection suppressor 1 to 2 inches thick, fluid carrying passages approximately one-quarter inch deep and for the FIG. 1 implementation, 2 to 4 inches of insulating material spaced between the bottom of the fluid carrying passages and housing base 10.

What is claimed is:

1. A non-hermetic flat plate solar fluid heater comprising:
    a. a first planar outer cover and a separated and parallel disposed first selectively coated absorber means for collecting and transmitting solar energy to a fluid to be heated,
    b. a first plastic convection suppressor means having a plurality of surfaces disposed intermediate to and in an abutting relationship between said first planar outer cover and said first selectively coated absorber means for forming a plurality of closed compartments for reducing heat losses,
    c. a plurality of passage means for carrying the fluid to be heated being disposed at one of its sides adjacent to aid first planar selectively coated absorber means,
    d. a second planar outer cover and a separated and parallel disposed second selectively coated absorber means disposed adjacent to the other side of said plurality of passage means for collecting and transmitting solar energy to the fluid to be heated, and
    e. a second plastic convection suppressor means having a plurality of surfaces disposed intermediate to and in an abutting relationship between said second planar outer cover and said second selectively coated absorber means for forming a plurality of compartments for reducing heat losses and for forming a dual sided unit.

2. A non-hermetic solar fluid heater as in claim 1, wherein:
    a. said first and second planar outer covers comprise a glass material.

* * * * *